(12) United States Patent
Vaccari

(10) Patent No.: US 7,591,233 B2
(45) Date of Patent: Sep. 22, 2009

(54) DEVICE FOR DISPENSING CARBON AND/OR CARBON DIOXIDE, PARTICULARLY FOR AQUARIUMS

(75) Inventor: Carlo Vaccari, Castelgomberto (IT)

(73) Assignee: Ferplast S.p.A. (IT)

( * ) Notice: Subject to any disclaimer, the term of this patent is extended or adjusted under 35 U.S.C. 154(b) by 653 days.

(21) Appl. No.: 10/568,799

(22) PCT Filed: Jun. 16, 2005

(86) PCT No.: PCT/IT2005/000343

§ 371 (c)(1),
(2), (4) Date: Feb. 17, 2006

(87) PCT Pub. No.: WO2006/001042

PCT Pub. Date: Jan. 5, 2006

(65) Prior Publication Data

US 2008/0156272 A1    Jul. 3, 2008

(30) Foreign Application Priority Data

Jun. 29, 2004  (IT) .................. VR2004A0111

(51) Int. Cl.
*A01K 63/04* (2006.01)
(52) U.S. Cl. ..................................... 119/259
(58) Field of Classification Search .................. 119/259, 119/260, 261, 263, 264, 268
See application file for complete search history.

(56) References Cited

U.S. PATENT DOCUMENTS 5,158,037 A * 10/1992 Engelbart .................... 119/226
5,292,431 A * 3/1994 Romagnoli .................. 210/127
7,244,356 B2 * 7/2007 Olivier ....................... 210/151

FOREIGN PATENT DOCUMENTS

| DE | 94 05 192 U1 | 5/1994 |
| DE | 200 15 086 U1 | 1/2002 |
| DE | 20 2004 002243 U1 | 4/2004 |
| FR | 2 682 302 A | 4/1993 |
| GB | 1 183 727 | 3/1970 |

* cited by examiner

*Primary Examiner*—Yvonne R. Abbott
(74) *Attorney, Agent, or Firm*—Greenberg Traurig LLP

(57) ABSTRACT

A device for dispensing $CO_2$, that is to say carbon or carbon dioxide, which can be fitted in aquariums or containers for holding live fish, comprising a dispenser casing (11) or body, equipped with a mixing chamber (15) into which a flow of water is delivered by a pump (12) and a flow of $CO_2$ from an infeed duct (18).

The mixing chamber (15) being bordered by at least one filtering element (13) which occupies the lower half of the dispenser body (11), closed at the front by a mesh cover (14).

6 Claims, 2 Drawing Sheets

DEVICE FOR DISPENSING CARBON AND/OR CARBON DIOXIDE, PARTICULARLY FOR AQUARIUMS

This application is a national stage filing under 35 U.S.C. 371 of International Application PCT/IT2005/000343, filed on Jun. 16, 2005. PCT/IT2005/000343 was published under PCT Article 21(2) in English.

TECHNICAL FIELD

This invention concerns a device for dispensing $CO_2$, that is to say carbon or carbon dioxide, which can be fitted in aquariums or containers holding live fish.

More specifically, the invention refers to a device for dispensing carbon dioxide that can be combined with a pumping device for aquariums, able to guarantee and optimise the process of diffusing and dissolving $CO_2$ particularly useful for the biological equilibrium of the aquarium and for its fertilisation.

This invention provides a solution for the correct distribution of carbon inside aquariums, guaranteeing the diffusion of the microbubbles and dissolving them in the water in a much more effective way.

The invention can be applied in particular in the industry of products for small pets, with particular reference to the aquarium sector.

BACKGROUND ART

It is known that carbon is one of the most important elements for plants, since it allows them to build support tissues (cellulose is, essentially, a carbon skeleton) and energy reserves (starch, which is a glucose polymer, a sugar) and to have, thanks to photosynthesis, the chemical energy that makes it possible to produce enzymes, proteins and everything else necessary for plant metabolism.

The use of $CO_2$ in aquariums is also chemical: it helps to stabilise the pH at values below 7, difficult to achieve with other methods, which are at the same time compatible with plant growing (such as, for example, filtration over peat) and long-lasting (like additives for lowering pH values).

However, the diffusion of carbon in the water of aquariums is always very limited and in order to have healthy and luxuriant plants it is therefore necessary to administer the carbon they need in an artificial form.

Carbon can be distributed in aquariums by means of various techniques, always in the gaseous state.

The most common method is to dispense amounts of carbon or carbon dioxide directly in the aquarium by using $CO_2$ cylinders equipped with pressure .gauges, pressure reducers and special water diffusers.

According to some systems the $CO_2$ bubbles follow a zigzag path, from the bottom upwards. This path ends in a dome-shaped cap which holds the bubbles until they dissolve in the water, preventing them from being lost in the atmosphere.

The disadvantages of this system consist of the fact that a period of activation is necessary, cleaning is difficult and there is a continuous accumulation of $CO_2$ in the cap, so that at a certain point it is lost. In addition, the area close to the dispenser, and to the cap in particular, is rich in $CO_2$ while the area furthest away is poor in $CO_2$.

In these dispensing models the $CO_2$ cap consists of a plastic rectangle inside which the $CO_2$ is accumulated and from which it inevitably escapes and is scattered on the surface.

This occurs when the mixing time of the gas with the water is greater than the time needed to fill the cap (area close to the cap saturated with carbon dioxide).

According to other distribution systems, the $CO_2$ bubble is forced to enter an atomiser, i.e. a system consisting of a plastic cap to be positioned close to the bottom of the aquarium, where it has to pass through a membrane that divides the bubble into lots of microbubbles which rise directly to the surface and scatter.

This atomiser model does not stand up to high pressures and the device cannot therefore be adjusted to dispense a high number of bubbles per minute.

The $Co_2$ dispenser is sometimes combined with a water delivery pump, but systems ensuring total mixing are not foreseen: the bubbles of gas are not directly struck by the flow of water and/or the microbubbles are not held in the mixing chamber, becoming scattered on the surface, and/or the adjustment of the pump output is dealt with by the user who is unlikely to have the ability to optimise the mixing.

For example, in the patent DE20015086U1, a pump dispenser model, the gas output goes directly to a pump which is designed to reduce the bubble into lots of microbubbles.

In this case the majority of the bubbles struck by the pump flow scatter on the surface, without being completely mixed with the water.

In the known dispensers in which the $CO_2$ bubble is forced to follow a zigzag path, above all those just installed and because of friction along the path, an "activation period" is required because the $CO_2$ bubble is unable to complete path and stops after a short distance.

This means that several bubbles accumulate in the same point until the bubble is so big that it slips out of the dispenser and is lost on the surface. After a certain period of time (this is the "activation" period) a coating is created along the entire path which allows the bubble to slide along individually and easily.

There are other distribution systems, but in general their use has revealed considerable disadvantages, which the invention intends to remedy, mainly concerning the fact that the traditional distribution of $CO_2$ is not very effective since some of the dispensed gas bubbles are not completely mixed with the water but rise almost immediately and are lost outside the system, thus thwarting their effect.

DESCRIPTION OF THE INVENTION

This invention proposes to provide a device for dispensing $CO_2$ in aquariums which is able to eliminate or at least reduce the problems described above.

The invention also proposes to provide a device for dispensing $CO_2$ in aquariums which is easy to produce in order to be economically advantageous.

This is achieved by means of a $CO_2$ dispenser whose features are described in the main claim.

The dependent claims of the $CO_2$ dispenser for aquariums describe advantageous embodiments of the invention.

The main advantages of this solution, in addition to those deriving from its construction simplicity, concern above all a better dissolving of the carbon in the water, due to the extremely reduced volume of the gas bubbles dispensed.

The dispenser according to the invention is the part of the $CO_2$ system immersed in the water which is designed to guarantee the mixing of the aquarium water and the $CO_2$.

The dispenser according to the invention substantially comprises a pump with a sponge prefilter, a transparent plastic dispenser body with a 20 ppi sponge and a mesh cover.

Thanks to the flow of water from the pump aimed at the gas output, the $CO_2$ bubble is split into a number of microbubbles; and:

1) a turbulent motion is created inside the dispenser chamber,
2) the microbubbles are held inside the dispenser by the sponge, the entire initial $CO_2$ bubble is completely dissolved in the water.

Moreover, thanks to the flow created by the pump, there is a continuous cycle of $CO_2$-poor water entering the dispenser and $CO_2$-rich water coming out of it, thus guaranteeing a uniform concentration of carbon dioxide in the aquarium and preventing the presence of $CO_2$ saturated and unsaturated areas.

The system according to the invention presents numerous important advantages, such as:

the carbon dioxide is dissolved 100% (maximum effectiveness);
there is no saturation of $CO_2$ in just one part of the aquarium, with a perfectly uniform concentration of carbon dioxide in the tank;
installation is easy and fast;
the dispenser is universal, it can be used with any $CO_2$ dispensing system such as cylinders, fermentation, etc.;
the system does not require an "activation" period.

DESCRIPTION OF THE DRAWINGS

Other features and advantages of the invention will become evident on reading the description below of one embodiment of the invention, given as a non-binding example, with the help of the accompanying drawings in which.

DESCRIPTION OF ONE EMBODIMENT OF THE INVENTION

Figure 1:
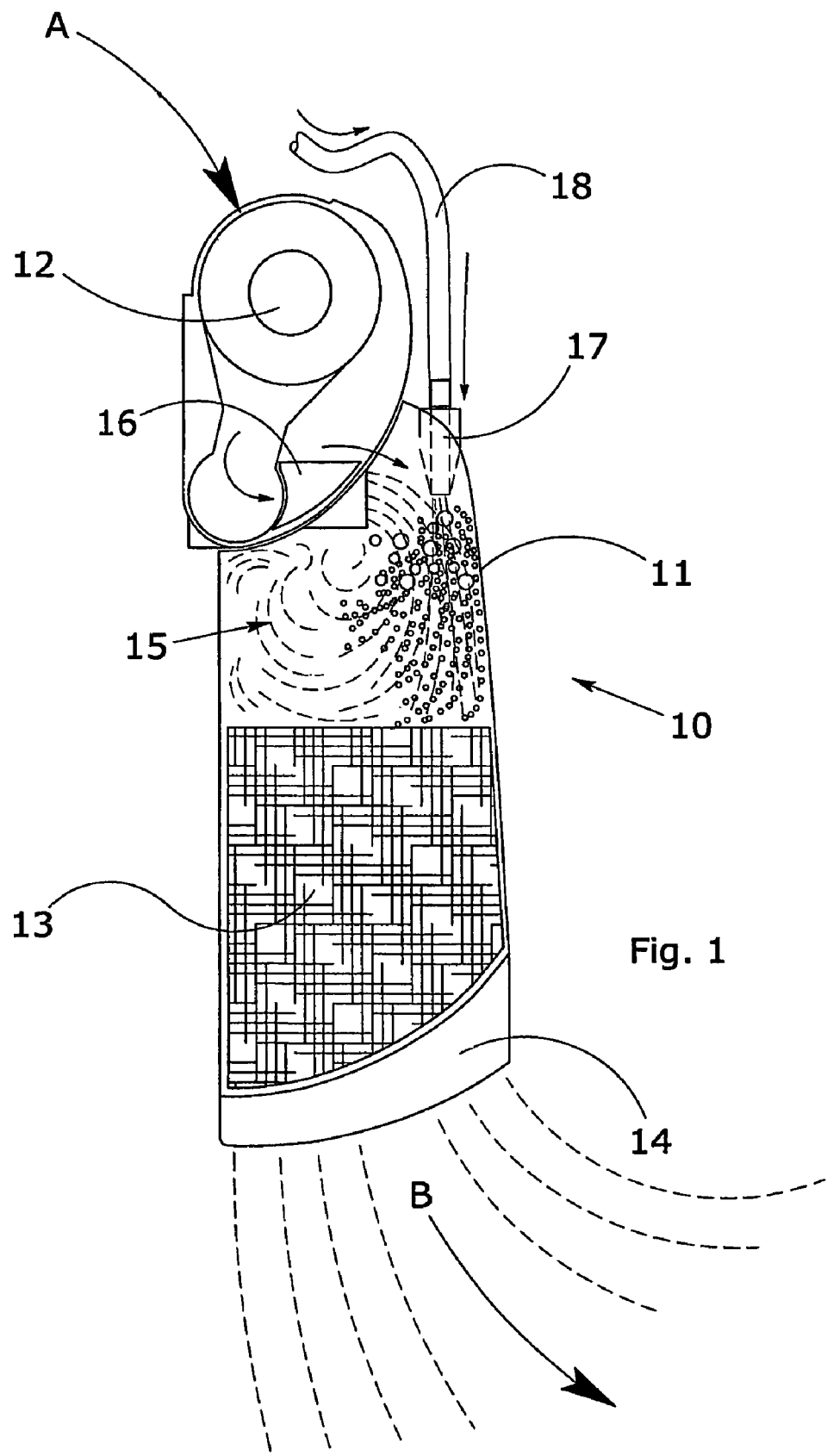
FIG. 1 shows a schematic side view of the overall dispenser according to the invention.
Figure 2:
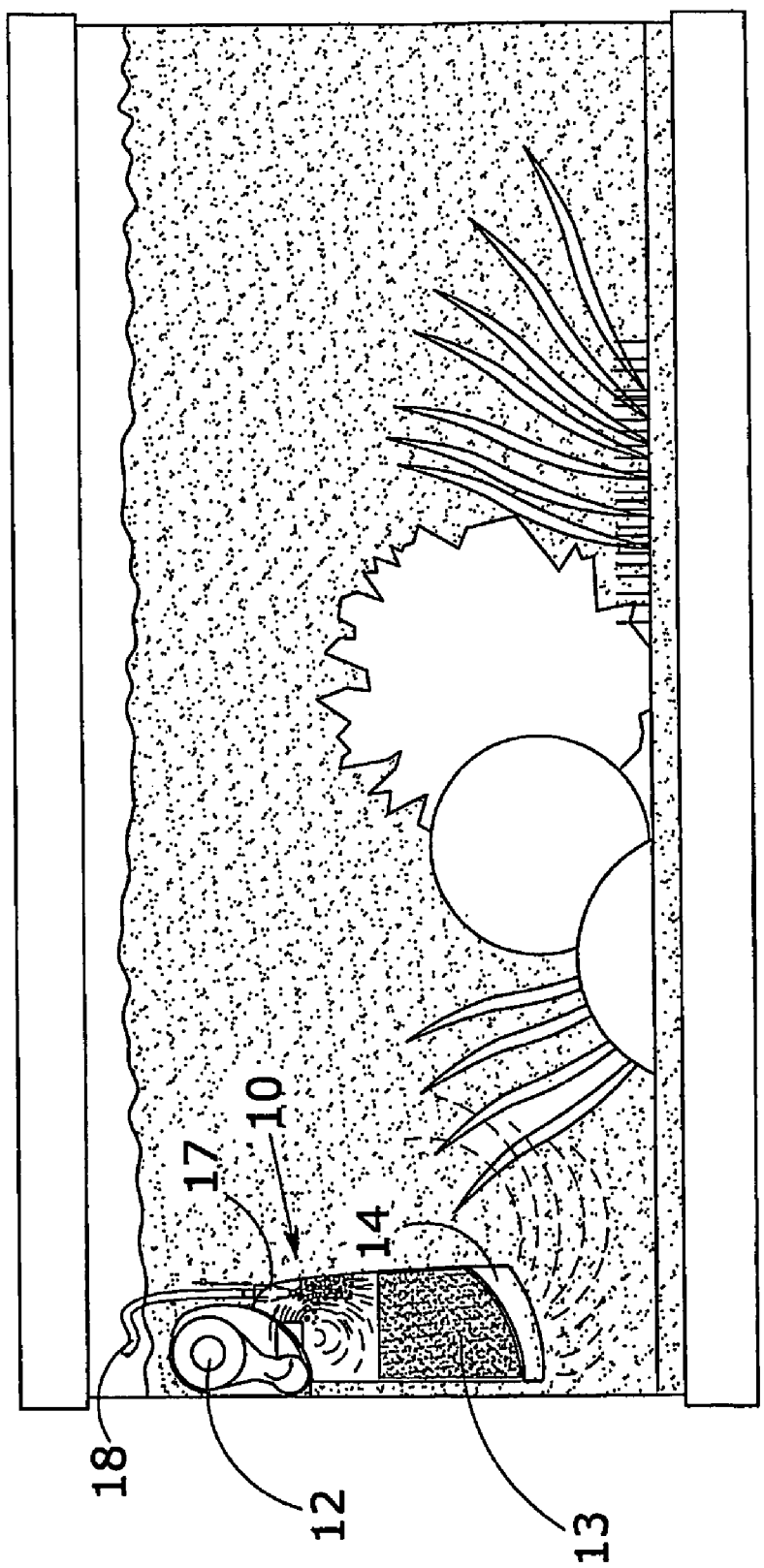
FIG. 2 shows a schematic view during its use in the aquarium.

The $CO_2$ dispenser according to the invention, indicated in general with the reference number 10, substantially consists of a dispenser casing 11 or body, connected to a water pump 12 which is in turn fitted with a sponge prefilter.

According toga preferred embodiment, the dispenser body 11 is made from transparent plastic and is equipped with an inner filtering element 13, which can consist of a sponge with a consistency of around 20 ppi, this sponge occupying approximately all the lower half, of the dispenser body, in an area opposite to where the pump 12 is fitted.

It is also possible to use any kind of filtering element which is able to retain the microbubbles and allow only the water in which the $CO_2$ is dissolved to pass through.

The end of the dispenser 11, that is to say the exterior of the part containing the filtering element 13, can be fitted with a mesh cover 14.

The dispenser 11 is also equipped with a mixing chamber 15 between the sponge 13 and the area where the pump 12 is fitted.

The flow delivered by the pump 12 enters an inlet duct 16 positioned horizontally.

The upper part of the dispenser body 11 is fitted with the $CO_2$ injector 17, which emits quantities of carbon in the gaseous state, that is to say carbon dioxide from a duct 18 connected to a supply cylinder or other source.

It can be noted that the flow of water delivered through the inlet duct 16, positioned horizontally inside the chamber 15, is substantially at right angles to the $CO_2$ injector 17 which is instead positioned vertically, with the gas output area close to the water output area.

The flow of water from the pump 12 is therefore mixed with the flow of gas delivered by the injector 17, since the water and gas meet at right angles to each other at the start of the mixing chamber 15.

Thanks to the flow of water from the pump 12 striking the output of the gas 17, the bubbles of $CO_2$ are broken up into lots of microbubbles.

A turbulent movement is in fact created inside the dispenser chamber 15, causing the formation of microbubbles which are retained inside the dispenser by the sponge 13.

In this way, the entire $CO_2$ bubble is completely dissolved in the water, becoming an integral part of it.

Moreover, thanks to the flow created by the pump 12, a continuous cycle of $CO_2$-poor water is established. This enters the dispenser 11 (arrow A FIG. 1) and $CO_2$-rich water exits through the mesh cover 14 (arrow B FIG. 1), thus ensuring a uniform concentration of carbon dioxide in the tank, avoiding the presence of $CO_2$ saturated and unsaturated, areas in the aquarium.

The $CO_2$ distribution system described above presents numerous important advantages compared to traditional dispensers.

Above all, the dispenser is particularly efficient as the carbon dioxide is dissolved 100%.

There is also a totally uniform concentration of carbon dioxide in the tank due to the absence of $CO_2$ saturation in individual parts of the aquarium.

Other advantages concern the possibility of easy and fast installation of the dispenser and its universality and versatility, due to the fact that it can be used with any $CO_2$ distribution system such as cylinders, fermentation, etc.

Finally, the system does not require the "activation time" of traditional dispensers, since in the dispenser according to the invention the microbubbles are distributed and mixed in the water right from the start. The particles of carbon are thus dispensed directly in the microbubbles, with all the consequent advantages for plant and animal vitality in the aquarium.

The invention is described above with reference to a preferred embodiment. It is nevertheless clear that the invention is susceptible to numerous variations that lie within its scope, in the framework of technical equivalents.

The invention claimed is:

1. A device for dispensing $CO_2$, that is to say carbon or carbon dioxide, which can be fitted in aquariums or containers for holding live fish, the device comprising a dispenser casing or body, wherein the dispenser body is equipped with a mixing chamber into which a flow of water is delivered by a pump and a flow of $CO_2$ from an infeed duct; the mixing chamber being bordered by at least one filtering element which occupies the lower half of the dispenser body, which can also be closed by a mesh cover, wherein said flow of water delivered by the pump through the inlet duct, placed in a substantially horizontal position inside the mixing chamber, is substantially at right angles to a $CO_2$ injector attached to the infeed duct, which is, instead, arranged vertically with the gas delivery zone positioned in correspondence with the water output zone.

2. The device for dispensing $CO_2$ of claim 1, wherein said flow of water delivered by the pump is mixed with the flow of gas delivered by the injector, since the water and gas meet at right angles to each other at the start of the mixing chamber.

3. A device for dispensing $CO_2$, that is to say carbon or carbon dioxide, which can be fitted in aquariums or containers for holding live fish, the device comprising a dispenser casing or body, wherein the dispenser body is equipped with a mixing chamber into which a flow of water is delivered by a pump and a flow of $CO_2$ from an infeed duct; the mixing chamber being bordered by at least one filtering element which occupies the lower half of the dispenser body, which can also be closed by a mesh cover, wherein inside the mixing chamber the pump creates a turbulent movement causing the formation of microbubbles of $CO_2$, which are retained inside the dispenser by the filtering element and then distributed in the water, mixing perfectly with it.

4. The device for dispensing $CO_2$ of claim 3, wherein the filtering element comprises any material of any kind and density which is able to retain the microbubbles and allow only the water in which the $CO_2$ is dissolved to pass through.

5. The device for dispensing $CO_2$ of claim 4, wherein the filtering element comprises a sponge with a consistency of around 20 ppi, the sponge occupying approximately all the lower half of the dispenser body, in a part opposite the area where the pump is fitted.

6. A device for dispensing $CO_2$, that is to say carbon or carbon dioxide, which can be fitted in aquariums or containers for holding live fish, the device comprising a dispenser casing or body, wherein the dispenser body is equipped with a mixing chamber into which a flow of water is delivered by a pump and a flow of $CO_2$ from an infeed duct; the mixing chamber being bordered by at least one filtering element which occupies the lower half of the dispenser body, which can also be closed by a mesh cover, wherein said flow created by the pump establishes a continuous cycle of $CO_2$-poor water which enters the dispenser, and $CO_2$-rich water which exits from the opposite end through the mesh cover, thus ensuring a uniform concentration of carbon dioxide in the tank.

* * * * *